(12) United States Patent
Bujak

(10) Patent No.: US 7,422,086 B2
(45) Date of Patent: Sep. 9, 2008

(54) VEHICLE IMPACT SENSOR USING BOTH ACCELEROMETER AND PRESSURE SENSING FOR SIDE IMPACT DETECTION

(75) Inventor: Christopher Richard Bujak, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1048 days.

(21) Appl. No.: 10/249,132

(22) Filed: Mar. 18, 2003

(65) Prior Publication Data

US 2004/0182627 A1 Sep. 23, 2004

(51) Int. Cl.
*B60R 21/01* (2006.01)
(52) U.S. Cl. .................. 180/274; 180/282; 280/735; 280/730.2; 701/45
(58) Field of Classification Search .......... 280/735, 280/730.2; 180/274, 282; 340/436, 438; 701/45

See application file for complete search history.

(56) References Cited

U.S. PATENT DOCUMENTS

| | | | |
|---|---|---|---|
| 3,495,675 A | 2/1970 | Hass et al. | |
| 3,851,305 A | 11/1974 | Baba et al. | |
| 3,889,232 A | 6/1975 | Bell | |
| 5,338,062 A | 8/1994 | Kiuchi et al. | |
| 5,428,534 A | 6/1995 | Wetzel et al. | |
| 5,684,336 A | 11/1997 | McCurdy | |
| 5,748,075 A * | 5/1998 | Dirmeyer et al. | 280/735 |
| 5,793,005 A | 8/1998 | Kato | |
| 6,095,553 A * | 8/2000 | Chou et al. | 280/735 |
| 6,109,648 A | 8/2000 | Luo et al. | |
| 6,234,519 B1 | 5/2001 | Breed | |
| 6,271,747 B1 | 8/2001 | Fendt et al. | |
| 6,274,948 B1 * | 8/2001 | Blank et al. | 307/10.1 |
| 6,487,482 B1 * | 11/2002 | Mattes et al. | 701/45 |
| 6,520,536 B2 * | 2/2003 | Foo et al. | 280/735 |
| 6,553,295 B1 * | 4/2003 | Bauch et al. | 280/735 |

\* cited by examiner

*Primary Examiner*—Ruth Ilan
(74) *Attorney, Agent, or Firm*—Dickinson Wright PLLC; Frank MacKenzie; Ray Coppiellie

(57) ABSTRACT

A restraint control system (40) for an automotive vehicle (10) is illustrated with a first sensor such as a door cavity pressure sensor (28) and a second sensor such as an accelerometer (30). A restraint device (54) is coupled to a controller (52) that controls the operation of the restraint device in response to the first sensor (28) and the second sensor (30). When either the signal from the first sensor or the signal from the second sensor is above a first or second threshold, respectively, the two signals are compared. In response to the comparison, the restraint device (54) is deployed.

19 Claims, 4 Drawing Sheets

Reference Vehicle Coordinate System

VEHICLE IMPACT SENSOR USING BOTH ACCELEROMETER AND PRESSURE SENSING FOR SIDE IMPACT DETECTION

BACKGROUND OF INVENTION

The present invention relates generally to restraint systems for automotive vehicles, and more specifically, to a system that uses two sensors to determine a crash event.

Automotive vehicles are required to include passenger and driver front airbags. Many vehicles now also include side airbags or side curtain airbags. Such systems typically include an accelerometer that measures the lateral acceleration to determine the presence of a crash event. Typically, an accelerometer is located on each side of the vehicle to determine if enough deceleration is present to deploy the corresponding airbag.

Other systems use two sensors such as a pressure sensor that measures the air pressure of the cavity of a door or other enclosed space and an accelerometer that measures lateral acceleration of the vehicle. Such systems deploy the airbag when either one of the sensors senses a crash event. In automotive vehicles, typically more than one type of restraint device is employed. These devices are suitable for different crash situations. Therefore, it is desirable to change the timing of the deployment of such devices for a specific situation.

SUMMARY OF INVENTION

The present invention provides an improved deployment system that uses two sensors to measure different crash characteristics and uses a comparison of the sensor signals to safe each other and to provide a particular type or series of deployments corresponding to a particular event mode in response to the measured sensor signals.

In one aspect of the invention, a system for an automotive vehicle having a door includes a first sensor that generates a first signal corresponding to a first crash characteristic and a second sensor generating a second signal corresponding to a second crash characteristic that is different than the first crash characteristic. The system also includes a restraint device and a controller that is coupled to the restraint device, the first sensor, and the second sensor. When either the first signal is above a first threshold or the second signal is above a second threshold, comparing the first signal and the second signal. The deployment of the restraint device is performed in response to the comparison of the first signal and the second signal.

In another aspect of the invention, a method of operating a restraint device comprises generating a pressure signal corresponding to a pressure within a door and generating an acceleration signal corresponding to the lateral acceleration of the vehicle. When the pressure signal is above a first threshold or the acceleration signal is above a second threshold, the pressure signal and the acceleration signal are compared. The restraint device is deployed in response to comparing the pressure signal and the acceleration signal.

One advantage of the invention is that by comparing each of the pressure signal and acceleration signal, a safing mode may be entered to provide a check as to whether or not to deploy the restraint device.

Another advantage of the invention is that by using the signals from both sensors, the type of crash may be categorized. By categorizing the crash, appropriate timing, deployments and non-deployments may be made.

Other advantages and features of the present invention will become apparent when viewed in light of the detailed description of the preferred embodiment when taken in conjunction with the attached drawings and appended claims.

DETAILED DESCRIPTION

Figure 1:
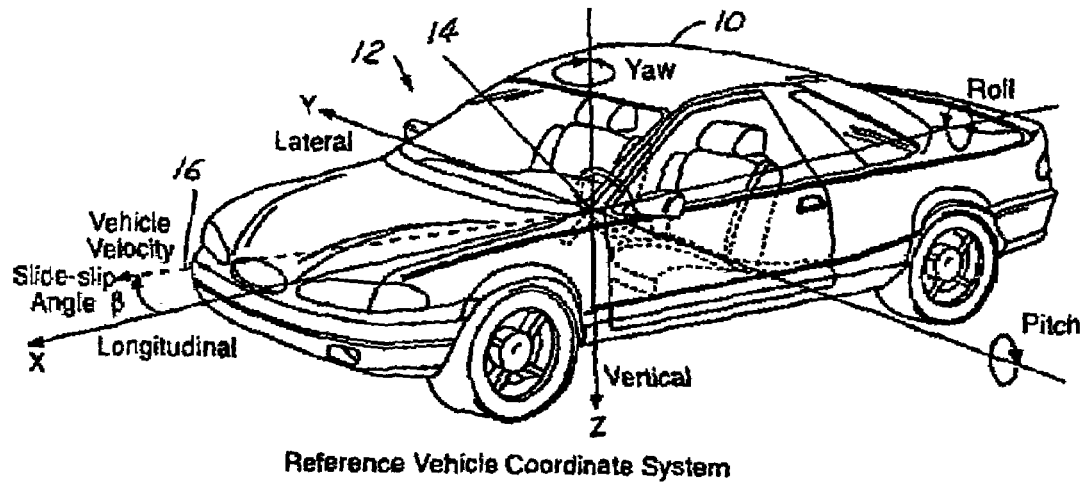
FIG. 1 is a perspective view of a vehicle having the various directions and dynamic forces relative to a vehicle axis centered at the center of gravity of the vehicle.

In the following figures, the same reference numerals will be used to identify the same components of the various views. The following figures are illustrated with respect to pressure and acceleration sensors. However, those skilled in the art will recognize the teachings set forth herein are applicable to various types of sensors. Also, the present invention may be used alone or with other types of safety systems or in combination with other sensors in the vehicle to provide different functions.

Referring now to FIG. 1, automotive vehicle 10 is illustrated with respect to a vehicle coordinate system 12. Vehicle coordinate system 12 has a longitudinal axis X, a lateral axis Y, and a vertical axis Z. The origin of each of the axes is the center of gravity 14 of automotive vehicle 10. Roll is the motion about the longitudinal axis X, yaw is the motion about the vertical axis Z, and pitch is the motion about the lateral axis Y. A side slip angle β is the angle between the X axis and the direction of vehicle velocity illustrated by arrow 16. It should be noted that acceleration and deceleration are used interchangeably. The difference in a mathematical sense is the sign which corresponds to a difference in direction.

Figure 2:
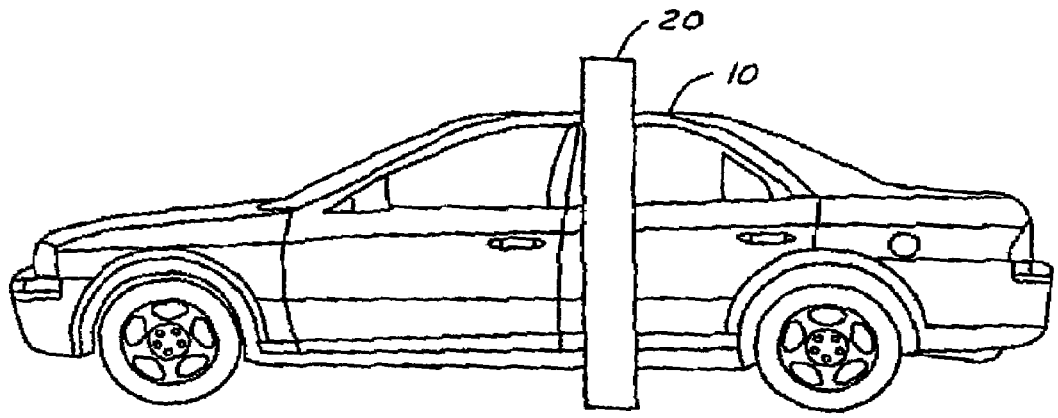
FIG. 2 is a side view of an automotive vehicle relative to a pole demonstrating one event mode.

Referring now to FIG. 2, automotive vehicle 10 is illustrated relative to pole 20. A collision with pole 20 illustrates one type of event mode that may be sensed by the present invention as will be further described below.

Figure 3:
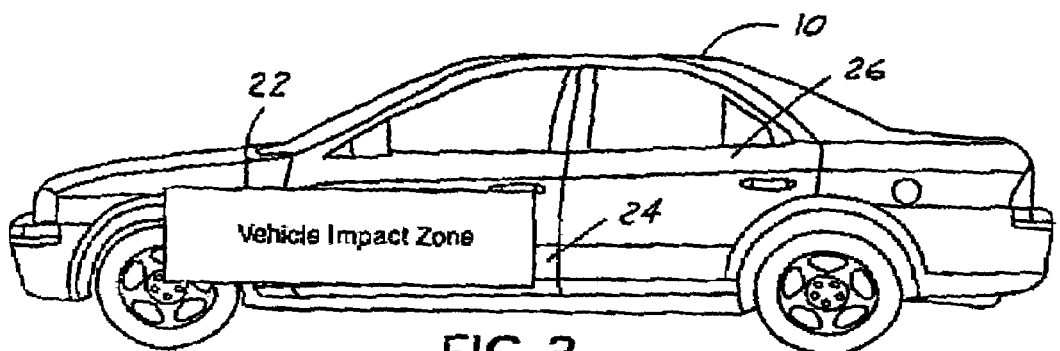
FIG. 3 is a side view of an automotive vehicle illustrating a vehicle impact zone illustrating a second event mode.

FIG. 3 illustrates a vehicle impact zone 22 that represents the potential area for another vehicle to impact vehicle 10. This represents another event mode. Vehicle impact zone 22 is shown with respect to front door 24. Of course, rear door 26 may also have a vehicle impact zone sensed by rearwardly placed sensors as will be described below.

Figure 4:
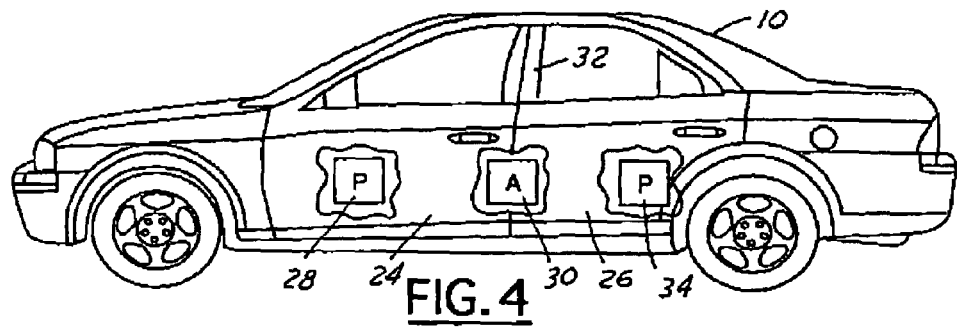
FIG. 4 is a partial cutaway side view of an automotive vehicle showing different placements of pressure sensors and an accelerometer.

Referring now to FIG. 4, automotive vehicle 10 is shown having a first door pressure sensor 28 and an accelerometer 30. Door pressure sensor 28 is used to generate a pressure signal corresponding to the pressure within the door 24. accelerometer 30 is located in a B pillar 32 of automotive vehicle 10. Accelerometer 30 generates a lateral acceleration signal for the vehicle. An optional second door pressure sensor 34 is located in rear door 26. Second door pressure sensor 34 generates a pressure signal corresponding to the pressure within rear door 26. It should be noted that in FIG. 4, one side of the vehicle is illustrated. The same sensors may also be used on the opposite sides of the vehicle and the opposite doors and opposite B pillar. Depending on the conditions, door pressure sensors and accelerometer 30 may provide various levels of indication of a crash depending on the type of crash.

Figure 5:
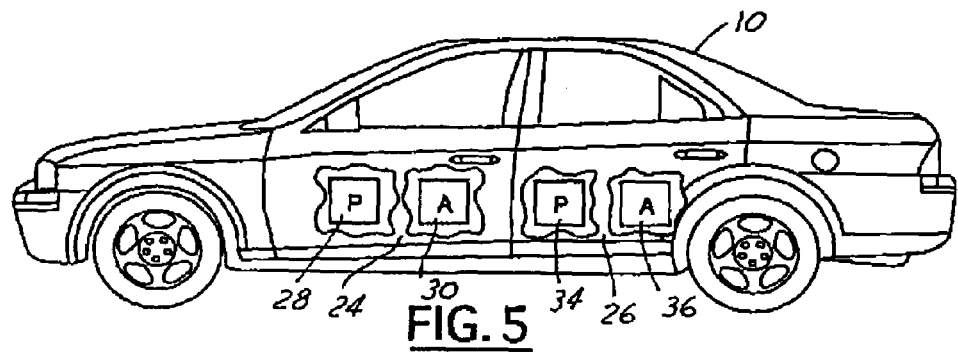
FIG. 5 is a partial cutaway side view of an automotive vehicle illustrating alternative locations of pressure sensors and accelerometers.

Referring now to FIG. 5, vehicle 10 is illustrated having first pressure sensor 28, second pressure sensor 34 located in respective front door 24 and rear door 26. First accelerometer 30 is positioned within door 24 rather than on B pillar 32 as shown in FIG. 4. A second accelerometer 36 is positioned in rear door 26. Of course, pressure sensor 34 and accelerometer 36 may be optional in various systems.

Figure 6:
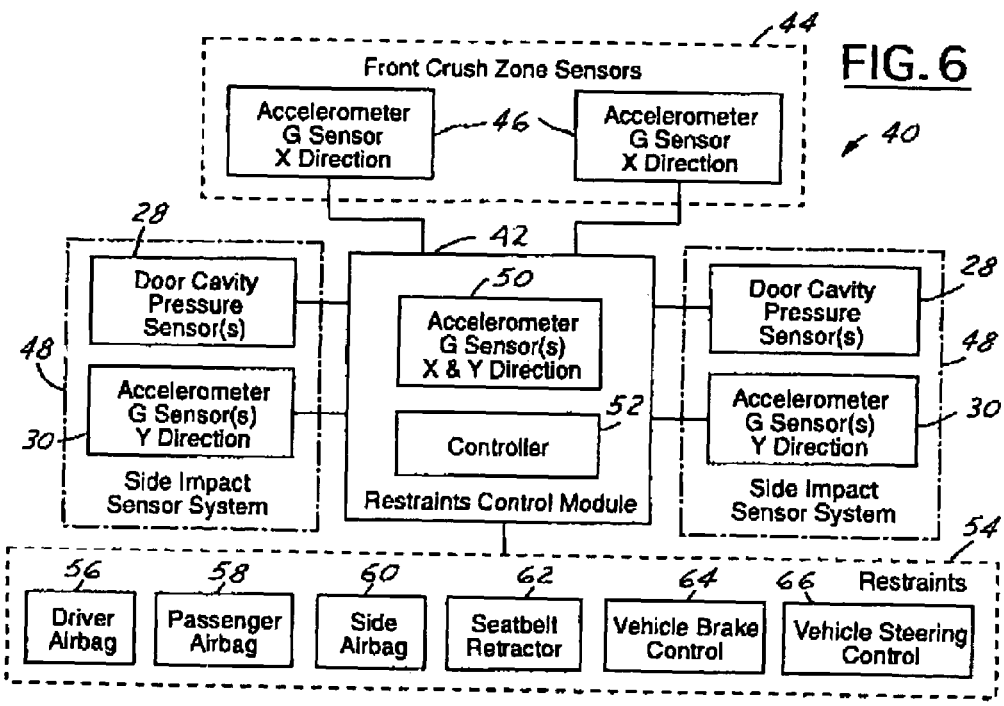
FIG. 6 is a block diagrammatic view of a method for operating a restraint device according to the present invention.

Referring now to FIG. 6, a restraint control system 40 has a restraint control module 42 therein. Restraint control module 42 is preferably microprocessor-based. In response to various sensors, the restraint control module controls various restraints in the vehicle. Restraint control module 42 may be coupled to front crush zone sensor 44 that may include accelerometers 46 that generate longitudinal acceleration signals.

Two side impact sensor systems 48 may also be coupled to restraints control module 42. Side impact sensor systems 48 may include a door pressure sensor or sensors 28 such as those described above, and an accelerometer or accelerometers 30, 36 as described above.

Two side impact sensor systems 48 may also be coupled to restraints control module 42. Side impact sensor systems 48 may include a door pressure sensor or sensors 28 such as those described above, and an accelerometer or accelerometers 30, 36 as described above.

In addition, a centrally located accelerometer 50 may be used to generate acceleration signals in both the X and Y direction.

As mentioned above, restraints control module 42 preferably has a microprocessor represented by controller 52. Of course, controller 52 has associated memory and timing devices associated with a conventional microprocessor. Restraints control module 42 is used to control various restraints 54 of the vehicle. Restraints 54 may include but are not limited to a driver airbag 56, a passenger airbag 58, a side airbag or plurality of side airbags 60, a seat belt retractor 62, vehicle brake control 64, and vehicle steering control 66. It should be noted that side airbag 60 and seat belt retractor 62 may include more than one. Vehicle brake control 64 and vehicle steering control 66 represent various control systems of the vehicle that may be activated in response to a sensed crash condition to control the ultimate position of the vehicle.

Figure 7:
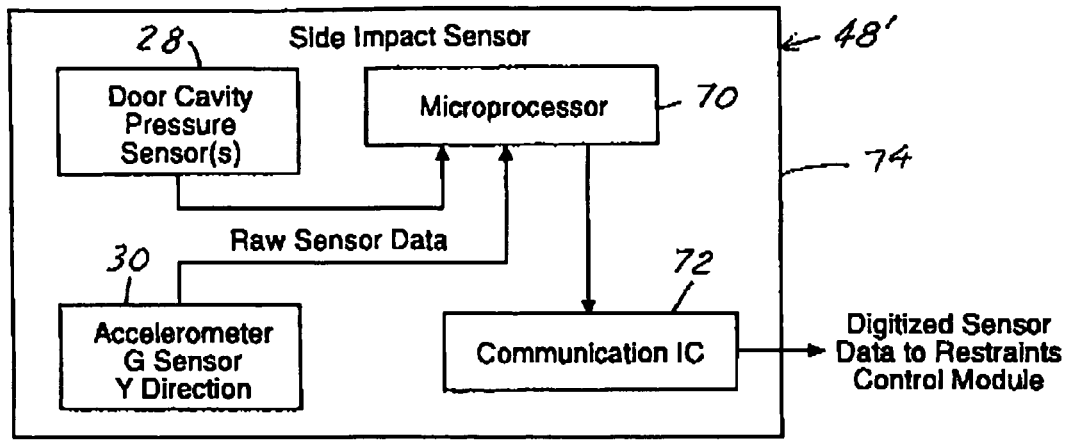
FIG. 7 is a block diagrammatic view of an alternative sensor configuration according to the present invention.

Referring now to FIG. 7, an alternative embodiment of a side impact sensor 48' is illustrated. In this embodiment door cavity pressure sensor or sensors 28 and accelerometers 30 are located together with a microprocessor 70 that receives raw sensor data from both the door cavity pressure sensor 28 and accelerometer 30. Microprocessor 70 converts the signals into a digital signal that is coupled to a communication integrated circuit (IC) 72. The communication integrated circuit 72 transmits the digitized sensor data to restraints control module 42 shown in FIG. 6. It should be noted that door cavity pressure sensor 28, accelerometer 30, microprocessor 70, and communication integrated circuit 72 may be located within a common housing 74.

Figure 8:
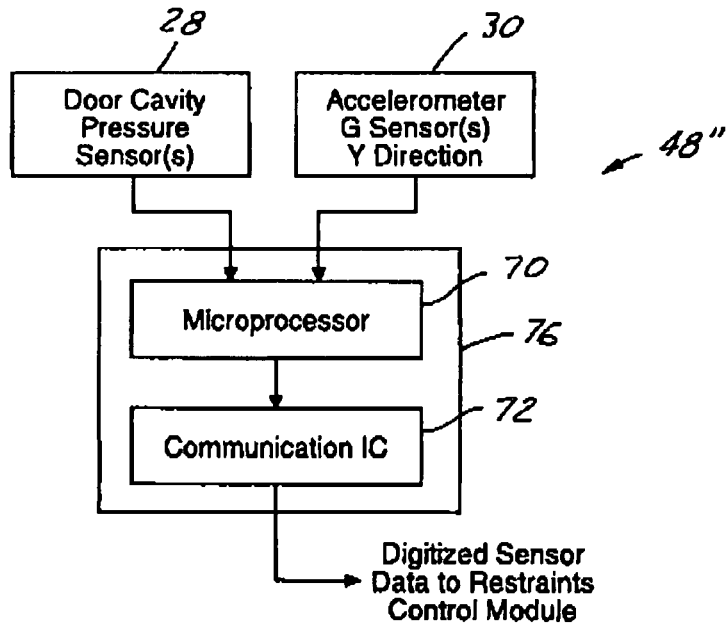
FIG. 8 is a block diagrammatic view of another sensor configuration according to the present invention.

Referring now to FIG. 8, another alternative embodiment of side impact sensor 48" is illustrated. In this embodiment, door cavity pressure sensor 28 and accelerometer 30 are located outside a module housing 76. Microprocessor 70 and communication IC 72 are located within the module housing 76. The output of communication IC 72 is coupled to the restraints control modules 42 as described above.

Figure 9:
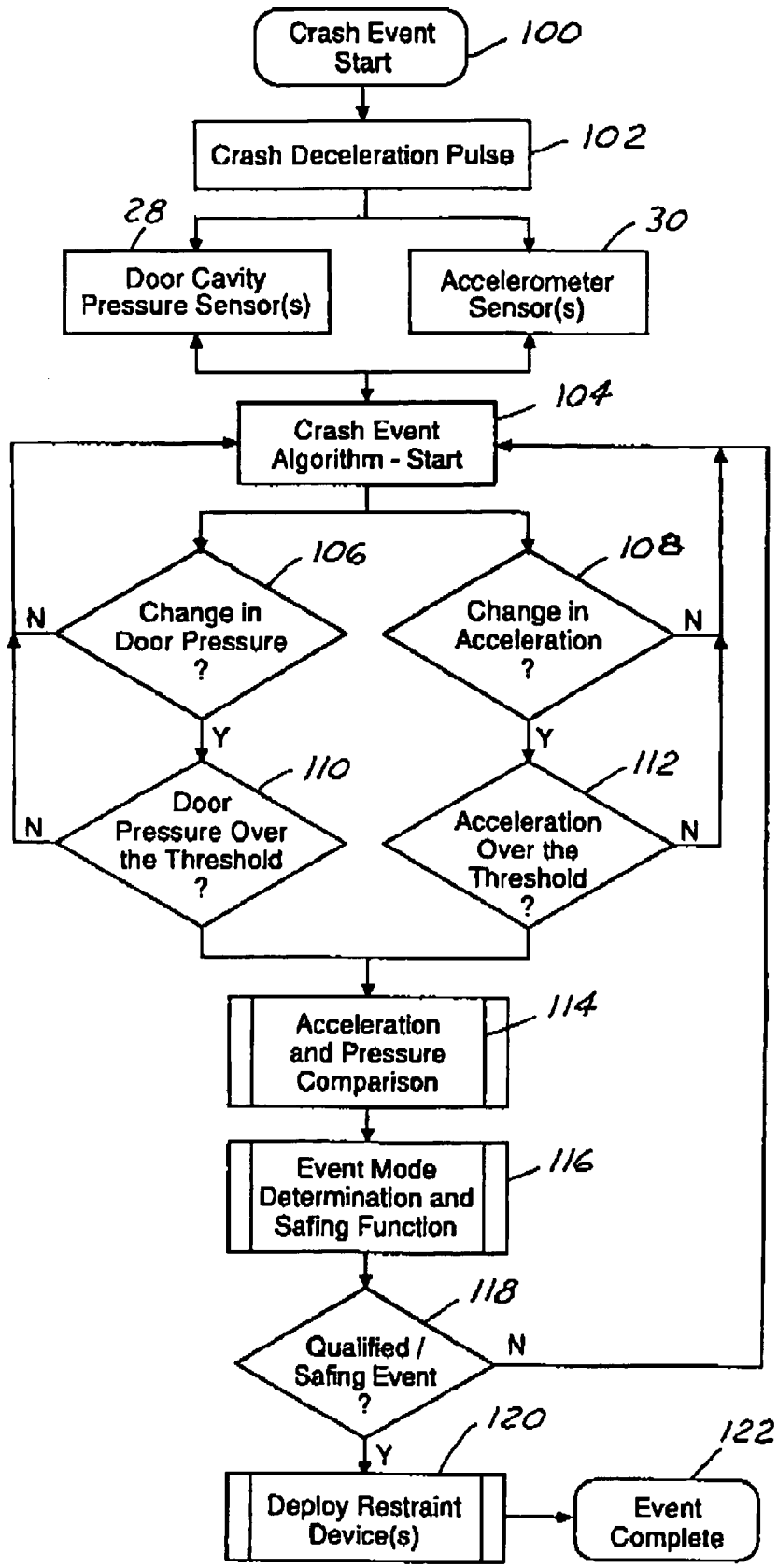
FIG. 9 is a flow chart illustrating a method for operating a restraint device according to the present invention.

Referring now to FIG. 9, the operation of the restraints control module is illustrated. In step 100 the crash event is started. In step 102 a crash deceleration pulse is applied to the vehicle 10. Door cavity pressure sensors 28 and accelerometers 30 generate respective signals which start a crash event algorithm 104. A change in door pressure in step 106 and a change in acceleration in step 108 are parallel paths through the crash event algorithm. When the door pressure sensor indicates a pressure greater than a first or pressure threshold in step 110, or the accelerometer 30 indicates an acceleration in excess of a second or acceleration threshold in step 112, the acceleration and pressure are compared in step 114. In step 114, by comparing the acceleration and pressure from the door cavity pressure signals 28 and the accelerometer 30, a safing mode is entered. That is, if a high level of pressure change is detected, some deceleration of the vehicle in the lateral direction may also be detected. If some change in acceleration is detected, some change in door pressure indicating a crash may also be detected. Thus, erroneous signals may be removed from consideration. Of course, these considerations are based on the vehicle and the number of sensors employed. Each different type of vehicle may include a different set of threshold, acceleration, and pressure parameters.

In step 116, the characteristics of pressure and sensor may be used to determine an event mode. Various types of event modes including but not limited to those illustrated in FIGS. 2 and 3 may be formed. That is, when the vehicle hits a pole sideways, one set of deployment criteria may be employed. When a vehicle is hitting the front quarter and/or front door of the vehicle or the rear quarter of the vehicle, another two types of event modes may be entered. Again, the various types of event modes and the sequence of deployment and the timing of the deployment varies based upon the vehicle model. Such values may be easily determined in pre-production testing. Step 116 may also perform the safing function described above with respect to step 114. In step 118 if during the safing function the event mode is not a qualified event, step 104 is executed. In step 118 if the event mode indicates a qualified event, various restraints such as those described above may be deployed in step 120. Of course, the timing and sequence of the deployments may be varied. Also, the number of restraint devices may also be varied. In step 122 the event is complete.

As can be seen by the above description, the various advantages of characterization and safing using at least two sensors is evident. Those skilled in the art will recognize that various embodiments such as that shown in FIG. 5 with more than one pressure sensor and more than one accelerometer may be used in the determination. Forward passengers and rearward passengers may then be protected in a different manner corresponding to their seating positions relative to the crash event.

While particular embodiments of the invention have been shown and described, numerous variations and alternate embodiments will occur to those skilled in the art. Accordingly, it is intended that the invention be limited only in terms of the appended claims.

The invention claimed is:

1. A system for an automotive vehicle having a door comprising:

a first sensor generating a first signal corresponding to a first crash characteristic comprising a door cavity pressure;

a second sensor generating a second signal corresponding to a second crash characteristic different than the first characteristic;

a restraint device; and a controller coupled to said first sensor, said second sensor and said restraint device, said controller when either the first signal is above a first threshold or the second signal is above a second threshold, comparing the first signal and second signal to each other and deploying a restraint device in response to comparing.

2. A system as recited in claim 1 wherein said controller categorizes an event mode in response to the first signal and the second signal and deploys the restraint device in response to the controller comparing the first signal and second signal and the controller categorizing the event mode.

3. A system as recited in claim 1 wherein said first sensor comprises a pressure sensor.

4. A system as recited in claim 1 wherein said second sensor comprises a lateral acceleration sensor and the second crash characteristic comprises lateral accleration.

5. A system as recited in claim 1 wherein said controller comparing comprises safing the first signal and the second signal.

6. A system as recited in claim 1 wherein said first sensor and said second sensor are coupled to a sensor processor for generating a first digital sensor signal and a second digital sensor signal in response to said first sensor signal and the second sensor signal respectively.

7. A system as recited in claim 1 wherein said restraint device is at least one of a driver airbag, passenger airbag, side airbag, side curtain airbag, seat belt retractor, vehicle brake controller, and vehicle steering controller.

8. A system for an automotive vehicle having a door comprising:

a first door pressure cavity sensor generating a first pressure signal corresponding to a pressure within the door;

a first accelerometer generating a first acceleration signal corresponding to lateral acceleration of the vehicle;

a restraint device; and a controller coupled to said first door pressure cavity sensor, said first accelerometer and said restraint device, when either the pressure signal is above a first threshold or the acceleration signal is above a second threshold, said controller comparing the pressure signal and the acceleration signal to each other, and deploying the restraint device in response to comparing.

9. A system as recited in claim 8 wherein said controller categorizes an event mode in response to the pressure signal and the acceleration signal and deploys the restraint device in response to the controller comparing the pressure signal and the acceleration signal and the controller categorizing the event mode.

10. A system as recited in claim 8 further comprising a second door pressure cavity sensor generating a second pressure signal and a second accelerometer generating a second acceleration signal coupled to said controller.

11. A system as recited in claim 10 wherein said controller deploys the restraint device in response to said second acceleration signal and said second pressure signal.

12. A system as recited in claim 8 wherein said accelerometer is disposed within a B-pillar.

13. A system as recited in claim 8 wherein said first door pressure cavity sensor and said first accelerometer are coupled to a sensor processor for generating a digital pressure sensor signal and a digital acceleration signal in response to said pressure signal and said acceleration signal, respectively.

14. A system as recited in claim 8 wherein said restraint device is at least one of a driver airbag, passenger airbag, side airbag, side curtain airbag, seat belt retractor, vehicle brake controller, and vehicle steering controller.

15. A system as recited in claim 8 wherein said pressure sensor is located in a front door of the automotive vehicle.

16. A system as recited in claim 8 wherein said pressure sensor is located in a rear door of the automotive vehicle.

17. A method of operating a restraint device comprising:

generating a pressure signal corresponding to a pressure within a door;

generating an acceleration signal corresponding to lateral acceleration of a vehicle;

when either the pressure signal is above a first threshold or the acceleration signal is above a second threshold, comparing the pressure signal and the acceleration signal to each other; and deploying a restraint device in response to comparing.

18. A method as recited in claim 17 further comprising categorizing an event mode in response to the pressure signal acceleration signal; and wherein deploying a restraint device comprises deploying a restraint device in response to comparing the pressure signal and the acceleration signal and categorizing the event mode.

19. A method as recited in claim 17 wherein comparing comprises safing the pressure signal and the acceleration signal.

* * * * *